Sept. 29, 1925.  1,555,509
Y. MARREC
VARIABLE SELF INDUCTION APPARATUS
Filed Dec. 15, 1924   2 Sheets-Sheet 1

INVENTOR
YVES MARREC,
ATTORNEYS

Sept. 29, 1925.

Y. MARREC 1,555,509

VARIABLE SELF INDUCTION APPARATUS

Filed Dec. 15, 1924    2 Sheets-Sheet 2

Inventor:
Yves Marrec,
By Toulmin & Toulmin
Attorneys.

Patented Sept. 29, 1925.

1,555,509

UNITED STATES PATENT OFFICE.

YVES MARREC, OF LONDON, ENGLAND.

VARIABLE SELF-INDUCTION APPARATUS.

Application filed December 15, 1924. Serial No. 755,914.

*To all whom it may concern:*

Be it known that I, YVES MARREC, residing in the city of London, England, a citizen of the Republic of France, have invented certain new and useful Improvements in Variable Self-Induction Apparatus, of which the following is a specification.

This invention relates to variable self-induction apparatus, and has for its object an apparatus of this kind of simple construction and cheap manufacture, the self-induction of which may be continuously varied in a very simple manner.

According to this invention, I provide an arrangement by which an electric conductor, constituted by a wire, strip, or the like, of flat or other cross-section, is fastened at the middle of its length on a winding element, hereafter referred to as the middle winding element, the two ends being adapted to be simultaneously wound on other separate winding elements, hereafter referred to as the end winding elements.

In such an arrangement, the whole length of the conductor which is coiled on the middle winding element has practically no self-induction, being a non-inductive winding, the magnetic fluxes of which, being opposite, neutralize one another. On the other hand, the two separate lengths of single conductor coiled on the end winding elements constitute a coil the self-induction of which varies with the length of conductor so wound.

By varying the amount wound on the several winding elements, the self-induction of the conductor may therefore be varied continuously from practically nil, when almost the whole of the wire is wound on the middle winding element, to a maximum when the wire is entirely unwound from the said middle winding element.

More usually the conductor will be of round, square or rectangular cross-section, and it will be wound so as to form helices, the diameter and pitch, and therefore the self-induction, of which will depend on the shape and size of the winding elements. In this case, the latter are preferably provided with suitable grooves adapted to receive the conductor. The conductor may, however, be flat, and wound so as to form spirals. The drums $b$, $b$ constituting the end winding elements may be of magnetic material, so as to constitute magnetic cores for the wound strips constituting the self-inductance. These cores may be independent. The faces of the casing $a$ in which the spindles of the winding elements are pivoted may be also of magnetic material, forming with the said cores a closed magnetic circuit.

Referring to the drawings:—

Figure 2:
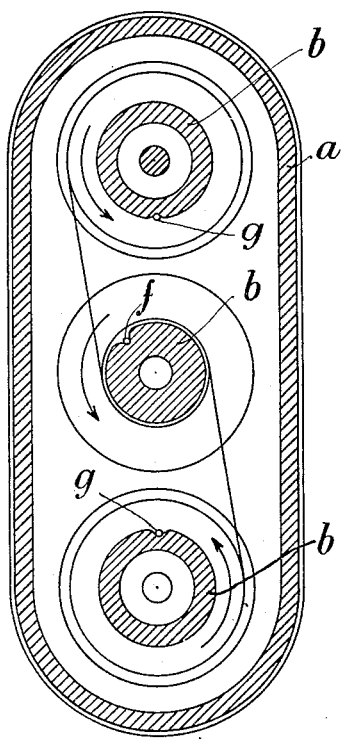
Fig. 2 shows a sectional front view.
Figure 1:
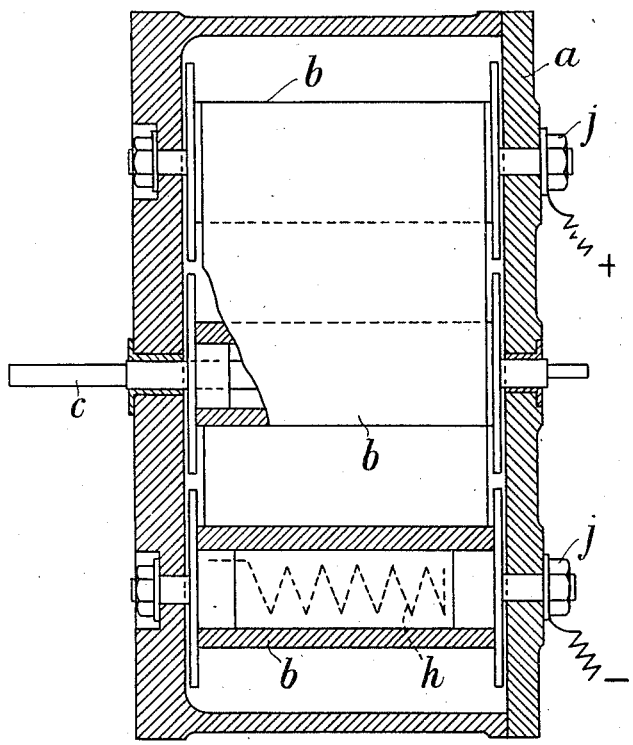
Fig. 1 shows a section of a variable self induction apparatus according to this invention.
Figure 3:
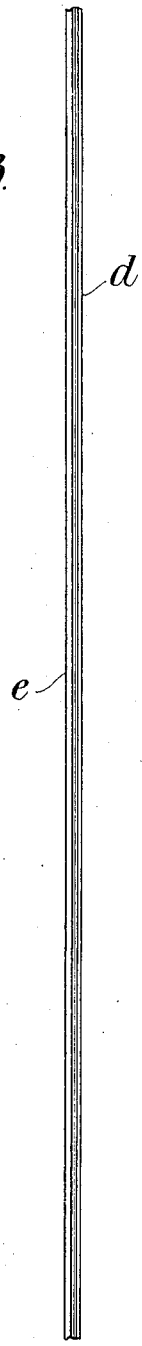
Fig. 3 is a sectional view of one of the strips.

This form of the apparatus has a case $a$, which may be of any suitable non-conducting material, and carries in bearings three drums $b$ $b$ $b$. The spindle on which the middle drum is carried is extended as shown at $c$ and an adjusting knob, with or without a graduated or vernier disc, is fitted thereon (the knob and disc are not shown). The strips are made from thin silk and each carries the conductor $d$ on one side and a woven mesh $e$, more or less coarse, on the other side. The conductors may be of metal foil, in which case they are bound and stitched at the edges as shown, or they may be made from sprayed metal, metallic paint, or otherwise.

There are two strips in this form of apparatus, and they are both pinned to the central drum at $f$ and to the end drums at $g$ $g$. If desired the non-conducting part of the strip may be continuous and may be carried under an anchoring wire on the middle drum.

The two end drums are hollow and contain springs $h$ which keep the strips in tension and unwind them from the middle drum when this is turned in the reverse direction.

The spindles of the end drums carry terminals $j$ $j$, by means of which a potential difference is applied to the coatings by means of the pins $g$ $g$ or otherwise.

What I claim and desire to secure by Letters Patent is:—

1. A variable self-induction coil, comprising a middle and two end winding elements a flexible conductor, fastened at the middle of its length on the middle winding element, the two ends being adapted to be simultaneously wound on the end winding elements.

2. A variable self-induction coil as claimed in claim 1, further characterized in that the conductor is flat.

3. A variable self-induction coil as claimed in claim 1, further characterized in that the end winding elements include drums which are constructed of magnetic material.

4. An induction coil as claimed in claim 1, having a casing with magnetic faces in which the end winding elements are pivoted on magnetic cores said faces forming with the cores a practically closed magnetic circuit.

In testimony whereof, I affix my signature.

YVES MARREC.